Figure 1:
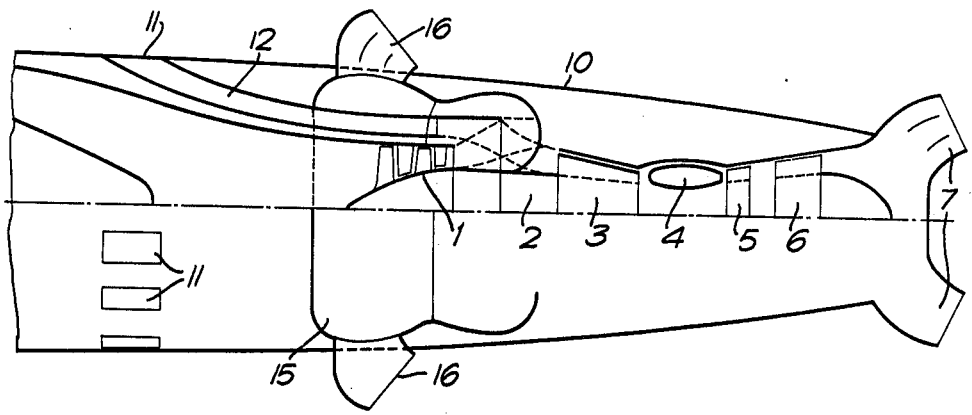

United States Patent [19]

Scrace

[11] 4,151,714
[45] May 1, 1979

[54] DUAL CYCLE GAS TURBINE ENGINE

[75] Inventor: Harold A. Scrace, Bristol, England

[73] Assignee: Rolls-Royce (1971) Limited, Great Britian

[21] Appl. No.: 786,551

[22] Filed: Apr. 11, 1977

Related U.S. Application Data

[63] Continuation of Ser. No. 644,803, Dec. 29, 1975, abandoned.

[30] Foreign Application Priority Data

Jan. 16, 1975 [GB] United Kingdom ............... 1905/75

[51] Int. Cl.² .................................................. F02K 3/06
[52] U.S. Cl. ...................................... 60/226 B; 60/230
[58] Field of Search ............... 60/226 R, 226 B, 229, 60/230; 244/12 D, 23 A, 23 C, 23 D

[56] References Cited

U.S. PATENT DOCUMENTS

| | | | |
|---|---|---|---|
| 2,961,198 | 11/1960 | Stevens | 244/12 D |
| 3,191,886 | 6/1965 | Lewis et al. | 60/226 R |
| 3,792,584 | 2/1974 | Klees | 60/226 R |

FOREIGN PATENT DOCUMENTS 1381085 10/1964 France ................................ 244/12 D Primary Examiner—Robert E. Garrett
Attorney, Agent, or Firm—Stevens, Davis, Miller & Mosher

[57] ABSTRACT

A dual cycle vectored thrust engine has a flow control valve for changing the cycle from a pure jet for supersonic operation to by-pass cycle for vertical take-off. The valve has two separate inlets, two separate outlets and passageways within the valve which provide flow communication between the inlets and the outlets, one part of the valve being rotatable relative to the other to change the direction of flow through one of the inlets from communication with one of the outlets to communication with the other of the outlets. The passageways leading to one of the outlets are shaped to turn the flow through up to 180° to enable the flow to be passed to front vectorable nozzles upstream of the valve.

3 Claims, 11 Drawing Figures

DUAL CYCLE GAS TURBINE ENGINE

This is a continuation of application Ser. No. 644,803 filed Dec. 29, 1975, and now abandoned.

The present invention relates to dual-cycle gas turbine engines including flow control valves for changing over from one cycle to another.

According to the present invention there is provided a dual cycle gas turbine engine including a flow control valve comprising an annular duct having two separate inlets and two separate outlets and a plurality of passageways within the valve which provide flow connections between the inlets and the outlets, one part of the valve being rotatable relative to the remainder so that flow through one of the inlets is changed over from communication with one of the outlets to communication with the other of the outlets and wherein the passageways leading to one of the outlets are shaped to turn the flow in a radial plane through at least 90 degrees.

In a preferred form of the invention the passageways leading to said one outlet turn the flow through 180 degrees so that the flow is reversed within the valve before emerging from the outlet. The outlet from the valve may thus be annular and in an axial plane adjacent the inlets.

Such a flow control valve has advantageous use in a variable cycle vectored thrust engine in which it enables flow compressed by a first compressor to be discharged through vectorable nozzles upstream of the valve thus increasing the distance of the nozzle efflux forward of the centre of gravity of an aircraft in which the engine is mounted.

One form of dual cycle engine to which the flow control valve is applicable comprises a first compressor having an outlet duct, a second compressor having an inlet passage, an auxiliary inlet duct, and an auxiliary outlet passage, a flow control valve being disposed in flow series between the two compressors so that its inlets communicate respectively with the outlet duct of the first compressor and the auxiliary inlet passage, and its outlets communicate respectively with the inlet passage leading to the second compressor and the auxiliary outlet passage. The flow of air within the valve can be selectively changed so that the flow compressed by the first compressor passes directly into the second compressor, at which time the auxiliary inlet and outlet may be blocked, or so that the flow compressed by the first compressor passes to the auxiliary outlet passage, in which case the second compressor is fed with air from the auxiliary inlet duct.

In a dual cycle vectored thrust engine the auxiliary outlet passage leads back upstream to forward vectorable propulsion nozzles.

Figure 2:
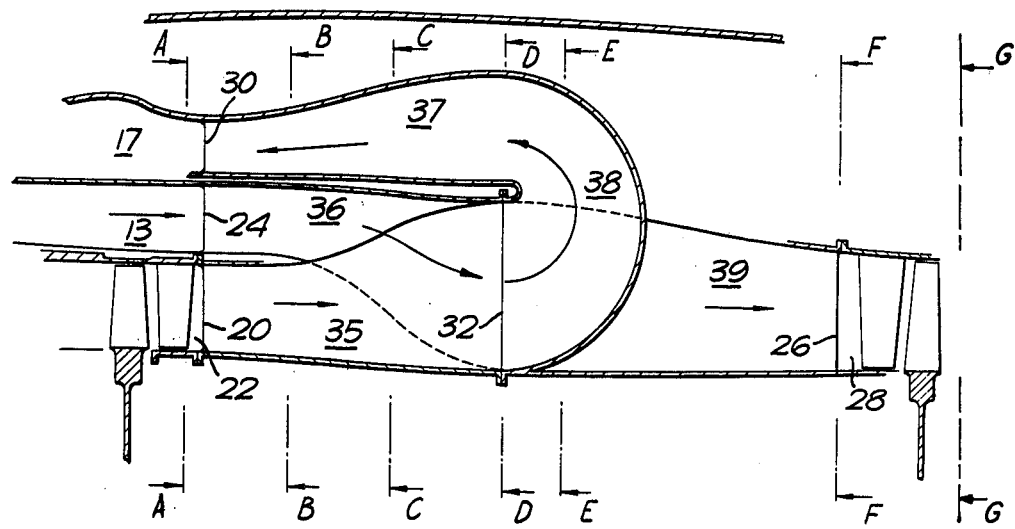
Figure 3:
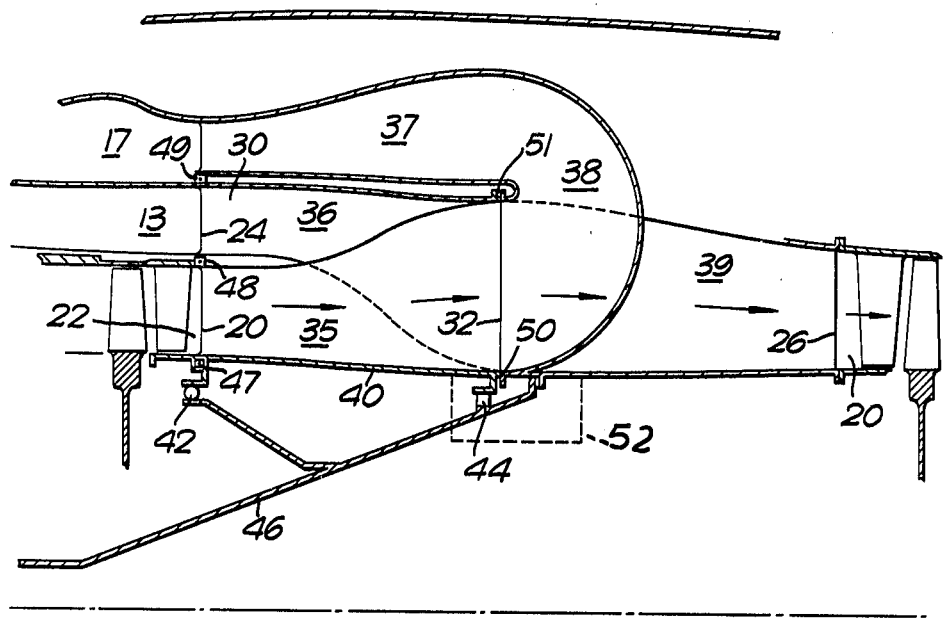
Figure 4:
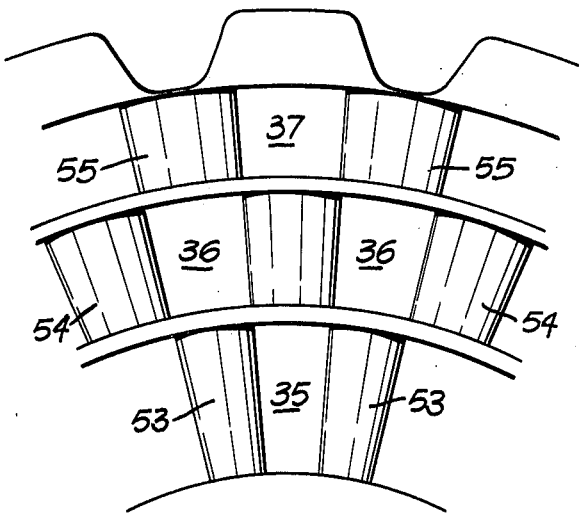
Figure 5:
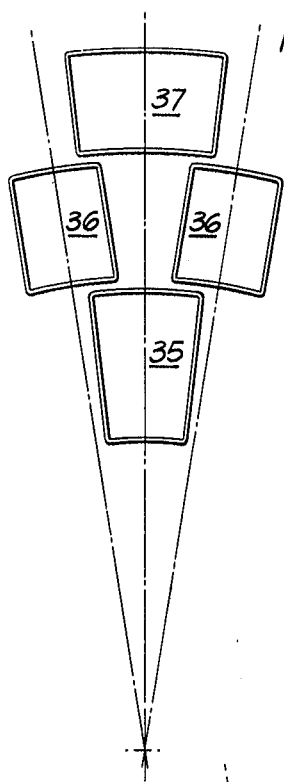
Figure 6:
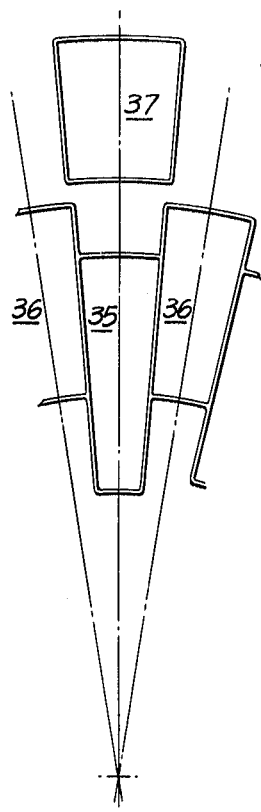
Figure 7:
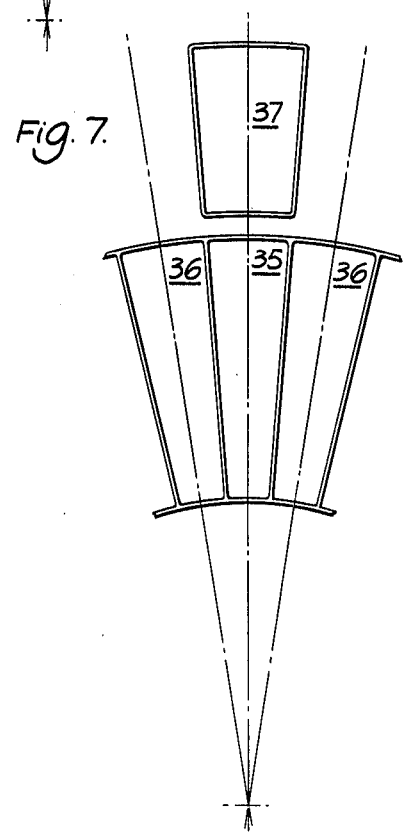
Figure 8:
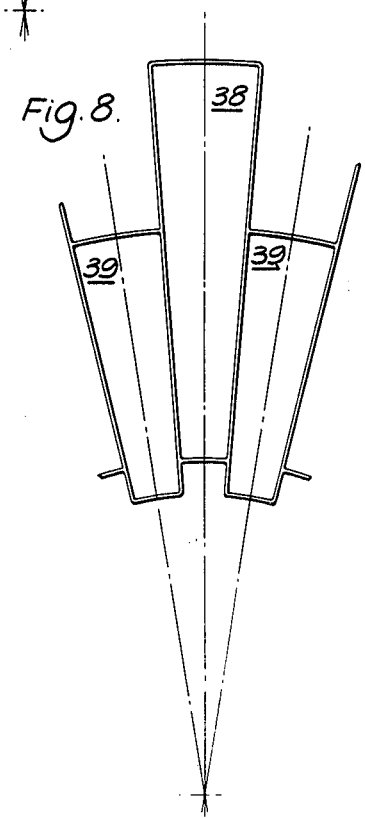
Figure 9:
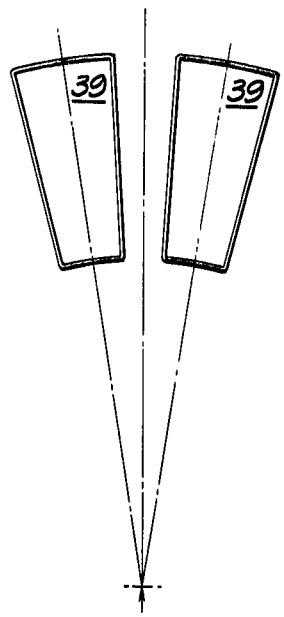
Figure 10:
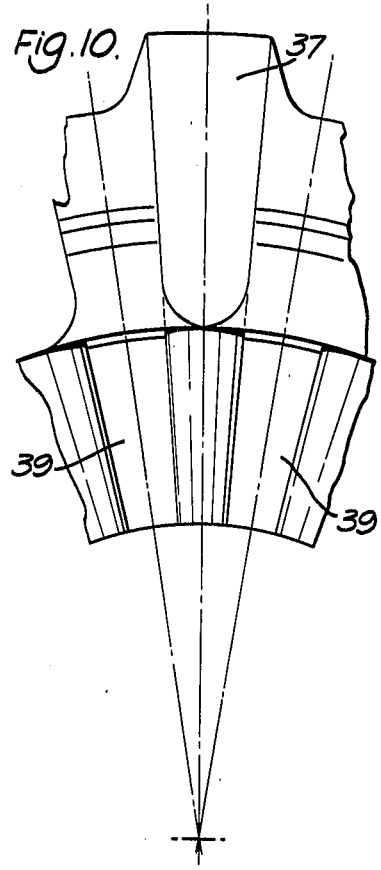
Figure 11:
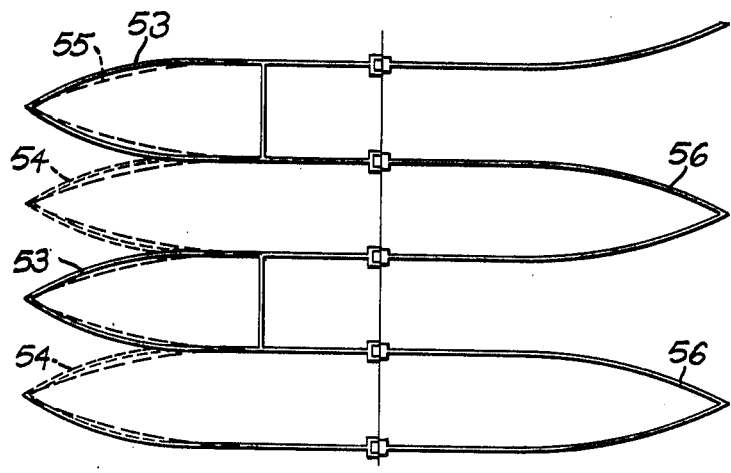

The invention will now be more particularly described merely by way of example with reference to the accompanying drawings in which:

FIG. 1 is a diagrammatic half-sectional elevation of a dual cycle vectored thrust engine incorporating a change-over valve of the present invention, FIG. 2 is an enlarged sectional view of the valve of FIG. 1 in one of its positions, FIG. 3 is an enlarged sectional view of the valve of FIG. 1 in another of its positions, FIG. 4 is a partial end view on line A—A of FIG. 2, FIG. 5 is a partial section on line B—B of FIG. 2, FIG. 6 is a partial section on line C—C of FIG. 2, FIG. 7 is a partial section on line D—D of FIG. 2, FIG. 8 is a partial section on line E—E of FIG. 2, FIG. 9 is a partial section on line F—F of FIG. 2, FIG. 10 is an end view of the valve on line G—G of FIG. 2, and FIG. 11 is a sectional plan view of FIG. 4.

Referring now to the drawings, in FIG. 1 there is shown a dual-cycle vectored thrust engine mounted in an aircraft. The top of the figure is sectioned to show the engine inside the fuselage.

The engine comprises a first compressor 1 mounted in a duct and arranged to receive air from a pair of intakes on the side of the aircraft fuselage.

Downstream of and in flow series with the first compressor are a change-over valve 2, a second compressor 3, combustion equipment 4, a high pressure (HP) turbine 5, a low pressure (LP) turbine 6 and a pair of vectorable propulsion nozzles 7.

On the fuselage of the aircraft, represented by line 10 are a series of doors 11 which close off auxiliary inlets 12 which lead directly to the valve 2. The inlets merge together into a single annular duct 13, (FIG. 2) at the valve face and duct 13 constitutes the auxiliary inlet duct. The doors 11 may be of the "blown-in" type which automatically open inwards when the pressure in the duct 13 is reduced below a certain level, or may be selectively operable by any suitable mechanical, pneumatic or hydraulic device under the control of a pilot's lever.

Also on the fuselage 10 is a plenum chamber 15 which is fed with air from the valve 2 and on which are supported a pair of vectorable nozzles 16. The plenum chamber is fed from the valve through an auxiliary outlet passage 17.

Referring now to FIGS. 2 and 3, the valve has a first annular inlet 20 which communicates with an outlet duct 22 leading from the downstream end of the first compressor, and a second annular inlet 24 which communicates with the auxiliary annular inlet duct 13. The valve also has a first annular outlet 26 at the downstream end of the valve, which communicates with an annular inlet passage 28 leading to the second compressor, and a second annular outlet 30 surrounding the inlets 20 and 24 and which communicates with the auxiliary outlet passage 17.

Within the valve itself each of the inlets and outlets are divided into a plurality of passageways 35,36,37 upstream of an interface 32, and 38,39 downstream of the interface 32.

The passageways 35 and 36 begin at the upstream end of the valve as radially separated passageways (FIG. 4) and change their spacial relationship in a downstream direction until at the interface 32 they are circumferentially interdigitated (FIG. 7). FIGS. 5 and 6 show the intermediate positions and shapes of the passageways. Similarly the passageways 37 change their shape in a downstream direction, increasing their radial dimension and becoming increasingly circumferentially separated until at the interface they are separated circumferentially by an amount equal to their own width.

On the other side of the interface the passageways 38, and 39 are interdigitated and their radial height area is equal to those of the passageways 35 and 36 with which they communicate. The passageways 39 extend downstream from the interface and gradually decrease their radial dimensions and become less circumferentially separated until at the outlet 26 they form an annulus.

The passageways 38 however, extend radially upwardly and turn rearwardly from the interface, and return over the interface in a series of circumferentially-spaced openings radially spaced from the radially inner ends of the passageways and suitable in area and position for communication with the downstream ends of passageways 37. This is illustrated by FIGS. 8 and 9.

It is important that the areas of these passageways at their ends, and at significant points along their length, are the same, since the flows down one may have to be passed into another one, and it is important that there are no sudden contractions or enlargements of the areas as the flows pass from one passageway to another.

For example, the area at entry to passageway 35 must be the same as the area at the interface of passageways 35 and 39, and the area at the inlet to passageway 36 must be the same as the areas at the interface of passageways 36,38 and 39 at the radially inner level, the same as the areas of passageways 38 and 37 at the interface plane at the radially outer level, and also the same as the areas of the passageways 37 and 39 at the outlet ends, thereof.

Variations in the areas between these specified points may occur if the size of the valve is kept to a minimum, but preferably the areas of the passageways remain constant from inlet to outlet to avoid pressure losses in the flows due to accelerations and decelerations of the flows.

The radially inner upstream part of the valve, i.e., that including passageways 35 and 36, is rotatable relative to the remainder of the valve in order to change-over communication of passageways 35 and 36 to different ones of the passageways 38 and 39. This can be achieved by rotating this part of the valve through an angle equivalent to the angular spacing of the passageways 35 and 36, so that, for example, the flow from passageway 35 can be changed from communication with passageway 39 to passageway 38.

The rotatable part of the valve and its mounting for rotation is described in more detail below in relation to FIG. 3.

The operation of the engine in its two modes is as follows:

In the first mode, as shown in FIG. 2, air from the bi-furcated intake flows into the first compressor 1 and into the valve at the inlet 20. It is conveyed through passageway 35 to the interface 32 and hence into passageways 38 and 37 to the outlet 30. From this outlet it passes to the plenum chamber 15 and is exhausted through the two cold air nozzles 16. The second compressor is fed with air from the doors 11 via the auxiliary inlet duct 13 and passageways 36 and 39 in the valve 2. This air passes through the core of the engine, i.e., the compressor, combustion equipment and turbines, and is ejected to atmosphere in a hot gas stream through the hot gas nozzles 7.

In this mode of operation the engine is relatively quiet since some of the air ingested is made to produce a low pressue cold gas stream which has low noise characteristics, and the hot gases are only compressed in one compressor so that they have lower velocity on emerging from the nozzles. Hence this mode of operation is utilized for operation at low speed near airfields and for take-off.

For high speed operation the engine is switched to the second mode of operation by rotating the valve part so that passageways 35 communicate at the interface with passageway 39 and passageways 36 communicate with passageways 38.

Air compressed by the compressor 1 therefore supercharges the second compressor to give a high pressure mode of operation.

In this mode there is no flow between the inlets 11 and the nozzles 7 because either the inlets, or the nozzles, or both are closed off to prevent drag. In a simple form the doors 11 are blow-in doors, spring biassed to close when the duct 13 is not open to the suction of compressor 3.

By reversing the flow to the front cold nozzles in the valve 2, the flow can be taken back upstream and is thus delivered at atmosphere at a greater distance forward than in a conventional four nozzle vectored thrust aircraft, for example as described in the specification to U.K. Pat. No. 881,662. This provides a greater moment arm for the gas efflux about the centre of gravity of the aircraft for the cold flow during vertical thrust operations. The greater moment would cause tipping of the aircraft if it were not balanced and this may be done by passing more of the gases through the hot nozzles and less through the cold nozzles. This gives a greater flexibility in the choice of the most efficient engine cycle.

Further advantages are greater choice in the position of the engine to balance the moment arm, and the ability to move the front nozzle sufficiently far forward to avoid the wings and the "suck down" effect caused by the nozzle discharge close to them.

FIG. 3 illustrates the mounting of the forward part of the valve. The radially inner portion of the valve. The radially inner casing 40 is mounted from a ball bearing 42 and a roller bearing 44 both of which are carried from the static downstream part of the valve which is a main structural member of the engine. The ball bearing 42 is carried from a cone 46 which also carries the rear main bearing, not shown, of the compressor 1. Piston ring seals 47,48,49,50 and 51 are provided between the static and rotating casings.

An actuating mechanism is shown diagrammatically for providing rotation of the rotatable part. Any suitable and convenient mechanism may be used, for example, the inner casing may be formed with a sector of bevel gear teeth, and a bevel gear driven by an axial shaft directly under the pilot's control and meshing with the teeth on the casing may cause rotation. Alternatively, tangentially operated hydraulic pistons may rotate the casing between two stops.

Preferably further means are included which may clamp the casings in their two positions after movement.

FIG. 11 shows a sectional plan view from FIG. 4 showing how the annular inlets and outlets are formed into passageways by faired walls.

Walls 53 are in the inlet 20, walls 54 are in the inlet 24, walls 55 are in the outlet 30, and walls 56 are in the outlet 26. The outlet fairings are at shallower angles than the inlet fairings to reduce drag.

It can be seen that the passageways 35 formed between walls 53 are disposed radially inwardly of the passageways 37 disposed between the walls 55 and in the same longitudinal plane.

I claim:
1. A dual-cycle gas engine including:
a first compressor having an outlet duct,
a second compressor having an inlet passage, both compressors being mounted for rotation about the engine axis,
an auxiliary inlet duct and an auxiliary outlet passage, an annular flow control valve disposed in flow series between the two compressors and co-axial therewith having inlets and outlets communicating with said ducts and passages respectively, and having passageways therethrough between said inlets and outlets, means for rotating a portion of the valve relative to the remainder thereof and about the engine axis so that flow through one of the inlets is changed over from communication with one of the outlets to communication with the other of the outlets, an interface plane at which the two relatively rotatable portions of the valve meet, the flow directing walls of the valve defining, at the inlet end of the valve on the upstream side of the interface, three annular rows of passageways concentric with the engine axis, two of which rows of passageways change their positional relationship between the plane of the inlets and the plane of the interface from one of mutual concentricity to one in which they form a single row of circumferentially interdigitated passageways, the third annular passageway remaining concentric with the said axis and defining at the plane of said inlets the outlet which communicates with the auxiliary outlet passage, the flow directing walls of the valve defining, on the downstream side of the interface, a single row of circumferentially interdigitated passageways at the interface corresponding in shape and size to those on the upstream side of the interface, alternate ones of said interdigitated passageways extending axially to the outlet end of the valve to form an annular outlet which communicates with the inlet of the second compressor, the other alternate ones of said interdigitated passageways turning through 180° to communicate with the third passageway on the upstream side of the interface.

2. A dual-cycle engine as claimed in claim 1 which includes forward and rearward vectorable propulsion nozzles and wherein the auxiliary outlet passage extends forwardly from the valve outlet to the forward propulsion nozzles.

3. A dual-cycle engine as claimed in claim 1 and wherein the means for rotating one part of the valve is connected to rotate the upstream part of the valve which includes the inlets, relative to the downstream part.

* * * * *